(12) United States Patent
Urushihara et al.

(10) Patent No.: US 12,278,025 B2
(45) Date of Patent: Apr. 15, 2025

(54) INSULATED COPPER WIRE AND ELECTRIC COIL

(71) Applicant: MITSUBISHI MATERIALS CORPORATION, Tokyo (JP)

(72) Inventors: Makoto Urushihara, Hitachinaka (JP); Hideaki Sakurai, Naka-gun (JP)

(73) Assignee: MITSUBISHI MATERIALS CORPORATION, Tokyo (JP)

(*) Notice: Subject to any disclaimer, the term of this patent is extended or adjusted under 35 U.S.C. 154(b) by 839 days.

(21) Appl. No.: 17/441,474

(22) PCT Filed: Feb. 17, 2020

(86) PCT No.: PCT/JP2020/006014
§ 371 (c)(1),
(2) Date: Sep. 21, 2021

(87) PCT Pub. No.: WO2020/195319
PCT Pub. Date: Oct. 1, 2020

(65) Prior Publication Data
US 2022/0148757 A1    May 12, 2022

(30) Foreign Application Priority Data
Mar. 27, 2019 (JP) .................. 2019-061635

(51) Int. Cl.
*H01B 7/02* (2006.01)
*B32B 15/088* (2006.01)
(Continued)

(52) U.S. Cl.
CPC ....... *H01B 7/0216* (2013.01); *H01B 13/0016* (2013.01); *H01F 5/06* (2013.01);
(Continued)

(58) Field of Classification Search
None
See application file for complete search history.

(56) References Cited

U.S. PATENT DOCUMENTS

2012/0125659 A1    5/2012    Nakako et al.
2020/0043629 A1    2/2020    Urushihara et al.

FOREIGN PATENT DOCUMENTS

CN    109427439 A    3/2019
JP    2005-174561 A    6/2005
(Continued)

OTHER PUBLICATIONS

International Search Report mailed Apr. 28, 2020, issued for PCT/JP2020/006014 and English translation thereof.
(Continued)

*Primary Examiner* — Jeffrey D Washville
(74) *Attorney, Agent, or Firm* — Troutman Pepper Locke LLP

(57) ABSTRACT

An insulated copper wire is an insulated copper wire having a copper wire and an insulating film coating a surface of the copper wire, in which the insulating film contains a polymer material having an amide bond, on a peeled surface formed on a surface of the insulated copper wire by peeling off the insulating film, there more copper atoms bonded to a nitrogen atom or a carbon atom than copper atoms bonded to an oxygen atom, an oxygen-containing layer containing 10 atom % or more of oxygen in a depth direction from the peeled surface is formed, and a film thickness of the oxygen-containing layer is in a range of 2 nm or more and 30 nm or less. An electric coil is formed by winding the above-described insulated copper wire.

5 Claims, 2 Drawing Sheets

(51) Int. Cl.
  *H01B 7/00* (2006.01)
  *H01B 13/00* (2006.01)
  *H01B 13/16* (2006.01)
  *H01F 5/06* (2006.01)
(52) U.S. Cl.
  CPC .......... *B32B 15/088* (2013.01); *H01B 7/0009* (2013.01); *H01B 13/16* (2013.01)

(56) References Cited

FOREIGN PATENT DOCUMENTS

| | | |
|---|---|---|
| JP | 2009-245857 A | 10/2009 |
| JP | 2010-153105 A | 7/2010 |
| JP | 2014-107227 A | 6/2014 |
| JP | 2014-154511 A | 8/2014 |
| JP | 2016-017085 A | 2/2016 |
| JP | 2017-010613 A | 1/2017 |
| JP | 6368241 B2 | 8/2018 |
| JP | 2019-012632 A | 1/2019 |
| WO | 2018/159279 A1 | 9/2018 |

OTHER PUBLICATIONS

Office Action mailed Dec. 9, 2022, issued for CN202080021132.6 and English translation of Search Report.
Supplementary European Search Report mailed Nov. 4, 2022, issued for European Patent Application No. 20776478.8.
Notice of Allowane mailed Apr. 27, 2023, issued for Chinese Patent Application No. 202080021132.6 and English translation thereof.

INSULATED COPPER WIRE AND ELECTRIC COIL

TECHNICAL FIELD

The present invention relates to an insulated copper wire and an electric coil formed by winding the insulated copper wire.

Priority is claimed on Japanese Patent Application No. 2019-061635, filed Mar. 27, 2019, the content of which is incorporated herein by reference.

BACKGROUND ART

An insulated copper wire has a copper wire and an insulating film configured to coat the surface of the copper wire. An electric coil formed by winding this insulated copper wire is used as an electric coil for a variety of electric devices such as motors or transformers. At the time of winding an insulated copper wire that is used as a material for electric coils in a coil shape, there is a case where a copper wire and an insulating film peel off from each other, the insulating film floats or wrinkles, and insulation becomes poor. This creates a demand for insulated copper wires to have strong adhesion between the copper wire and the insulating film.

As an insulated copper wire having improved adhesion between the copper wire and the insulating film, Patent Document 1 describes an insulated copper wire in which an engineering plastic having a melting point or softening point of 220° C. or higher is used as a material for an insulating film, and an oxide film having a thickness of 5 nm or more and 300 nm or less is present on the surface of a copper wire. In addition, Patent Document 2 describes an insulated copper wire in which thermoplastic resins such as a polyolefin sulfide resin and a polyether ether ketone resin are used as materials for an insulating film, and the atomic number ratio a/b of the atomic number a of oxygen to the atomic number b of copper at the time of analyzing the composition of a portion that comes into contact with an insulating layer of a copper wire by SEM-EDX at an accelerating voltage of 20 kV is set to 0.25 or less.

Patent Document 3 describes an insulated copper wire in which an insulating film contains inorganic particles made of the same metal as the main component of a copper wire or a compound containing the metal, the content percentage of the inorganic particles in an inner layer having a thickness of 800 nm from the circumference of the copper wire in the insulating film is 0.78 area % or more and 0.89 area % or less, and the inner layer contains a polyesteramide-based resin, a phenoxy resin, and a thiol-based compound.

CITATION LIST

Patent Documents

[Patent Document 1]
  Japanese Unexamined Patent Application, First Publication No. 2014-154511 (A)
[Patent Document 2]
  Japanese Unexamined Patent Application, First Publication No. 2017-10613 (A)
[Patent Document 3]
  Japanese Patent No. 6368241 (B)

SUMMARY OF INVENTION

Technical Problem

Incidentally, in response to the size reduction and weight reduction of electric devices in recent years, there has been a demand for the size reduction and densification of electric coils. However, in the case of winding an insulated copper wire in a coil shape with a small diameter or the case of edgewise bending a rectangular copper wire with a broad width in order for the size reduction or densification of electric coils, the copper wire and the insulating film are likely to peel off from each other, and the insulating film is likely to float or wrinkle in electric coils to be obtained. In insulated copper wires of the related art, there has been a case where the adhesion between a copper wire and an insulating film becomes insufficient in the case of winding an insulated copper wire in a coil shape with a small diameter or edgewise bending a rectangular copper wire with a broad width.

The present invention has been made in view of the above-described circumstances, and an objective of the present invention is to provide an insulated copper wire in which adhesion between a copper wire and an insulating film is strong and the copper wire and the insulating film are less likely to peel off from each other at the time of winding the insulated copper wire in a coil shape and an electric coil in which the floating or wrinkling of an insulating film is suppressed.

Solution to Problem

In order to solve the above-described problems, an insulated copper wire of the present invention is an insulated copper wire having a copper wire and an insulating film coating a surface of the copper wire, in which the insulating film contains a polymer material having an amide bond, on a peeled surface formed on a surface of the insulated copper wire by peeling off the insulating film, there are more copper atoms bonded to a nitrogen atom or a carbon atom than copper atoms bonded to an oxygen atom, an oxygen-containing layer containing 10 atom % or more of oxygen is formed in a depth direction from the peeled surface, and a film thickness of the oxygen-containing layer is in a range of 2 nm or more and 30 nm or less.

In the insulated copper wire of the present invention configured as described above, since a larger number of the copper atoms that are bonded to nitrogen atoms or carbon atoms are present than the copper atoms that are bonded to oxygen atoms on the peeled surface formed on the surface of the insulated copper wire by peeling off the insulating film, the adhesion between the copper wire and the insulating film becomes strong. The copper atoms that are bonded to nitrogen atoms or carbon atoms, which are detected on the peeled surface, are considered as copper atoms that diffuse from the copper wire to the insulating film and are bonded to nitrogen atoms or carbon atoms that configure the amide bond (—NH—CO—) of the insulating polymer material and as copper atoms that have a high affinity to the polymer material. On the other hand, the copper atoms that are bonded to oxygen atom, which are detected on the peeled surface, are considered as copper atoms that are derived from a copper oxide that has diffused from the copper wire to the insulating film and as copper atoms that have a low affinity to the polymer material. In addition, the peeled surface formed by peeling off the insulating film is a portion where the adhesion between the copper wire and the insulating film is weakest and the copper wire and the insulating film are most likely to peel off from each other in the insulated copper wire. That is, in the insulated copper wire of the present invention, since a number of the copper atoms having a high affinity to the polymer material (the copper atoms that are bonded to nitrogen atoms or carbon atoms)

are present on the peeled surface more than a number of the copper atoms having a low affinity to the polymer material (the copper atoms that are bonded to oxygen atoms), a peeled surface is less likely to be generated, and the copper wire and the insulating film are less likely to peel off from each other at the time of winding the insulated copper wire in a coil shape.

In addition, since the film thickness of the oxygen-containing layer containing 10 atom % or more of oxygen that is formed in the depth direction from the peeled surface is 2 nm or more, the adhesion between the copper wire and the insulating film becomes strong. In addition, since the film thickness of the oxygen-containing layer is as thin as 30 nm or less, the copper wire and the insulating film are less likely to peel off from each other due to fracture occurring in the oxygen-containing layer at the time of winding the insulated copper wire in a coil shape.

Here, in the insulated copper wire of the present invention, the polymer material having an amide bond is preferably polyamide-imide.

In this case, since the polyamide-imide has an amide bond (—NH—CO—) and an imide bond (—CONHCO—), copper atoms that are bonded to nitrogen atoms or carbon atoms are likely to be generated. Therefore, in the insulated copper wire in which the polymer material is polyamide-imide, more reliably, the copper wire and the insulating film are less likely to peel off from each other at the time of winding the insulated copper wire in a coil shape.

In addition, although not particularly limited, the content of the polymer material having an amide bond that is contained in the insulating film is preferably within a range of 50 mass % to 100 mass % and more preferably within a range of 75 mass % to 100 mass %.

In addition, although not particularly limited, the number average molecular weight of the polymer material having an amide bond that is contained in the insulating film is preferably within a range of 10000 to 40000 and more preferably within a range of 15000 to 30000.

In addition, in the insulated copper wire of the present invention, on the peeled surface, a ratio between a secondary ion intensity of a $CuC_2N_2^-$ ions and a total secondary ion intensity of a $CuO^-$ ions and a $Cu_2O^-$ ions that are measured by time-of-flight secondary ion mass spectrometry is preferably in a range of 2 or more and 50 or less.

In this case, since the ratio between the secondary ion intensity of the $CuC_2N_2^-$ ions that includes the copper atoms that are bonded to nitrogen atoms or carbon atoms and the total secondary ion intensity of the $CuO^-$ ions and the $Cu_2O^-$ ions that include the copper atoms that are bonded to oxygen atoms is as large as a range of 2 or more and 50 or less, more reliably, the copper wire and the insulating film are less likely to peel off from each other at the time of winding the insulated copper wire in a coil shape.

Furthermore, in the insulated copper wire of the present invention, the film thickness of the oxygen-containing layer is preferably a value measured by Auger electron spectroscopy.

In this case, since the film thickness of the oxygen-containing layer is a value measured by highly accurate Auger electron spectroscopy, it is possible to accurately control the film thickness of the oxygen-containing layer, which makes it possible to more reliably suppress the copper wire and the insulating film peeling off from each other due to fracture occurring in the oxygen-containing layer.

An electric coil of the present invention is formed by winding the above-described insulated copper wire.

The electric coil of the present invention configured as described above is formed by winding the above-described insulated copper wire, and the copper wire and the insulating film are less likely to peel off from each other at the time of winding the insulated copper wire in a coil shape, and thus the insulating film is less likely to float or wrinkle.

Advantageous Effects of Invention

According to the present invention, the objective, which is to provide an insulated copper wire in which adhesion between a copper wire and an insulating film is strong and the copper wire and the insulating film are less likely to peel off from each other at the time of winding the insulated copper wire in a coil shape and an electric coil in which the floating or wrinkling of an insulating film wire is suppressed, becomes possible.

DESCRIPTION OF EMBODIMENTS

Hereinafter, an insulated copper wire that is an embodiment of the present invention will be described with reference to accompanying drawings.

Figure 1:
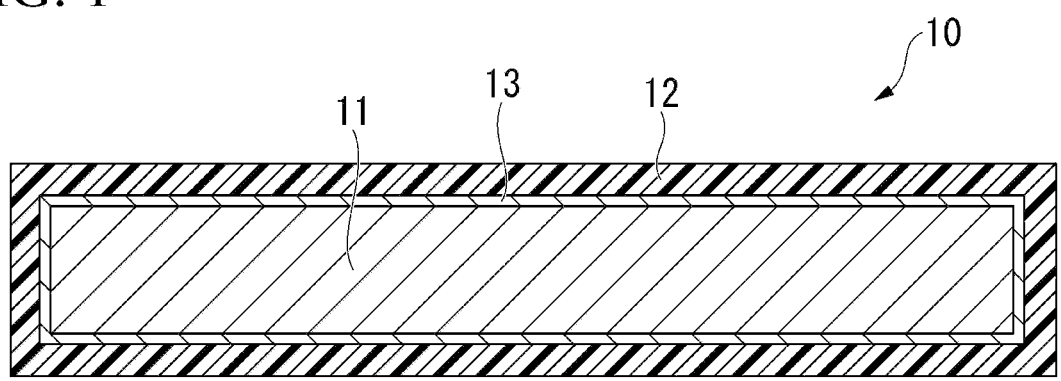
FIG. 1 is a transverse sectional view of an insulated copper wire that is an embodiment of the present invention.
Figure 2:
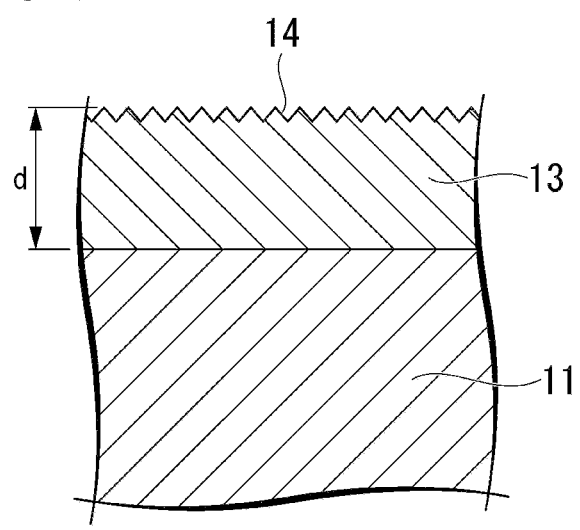
FIG. 2 is a transverse sectional view showing a state where an insulating film of the insulated copper wire shown in FIG. 1 has been peeled off.

FIG. 1 is a transverse sectional view of the insulated copper wire that is the embodiment of the present invention. FIG. 2 is a transverse sectional view showing a state where an insulating film of the insulated copper wire shown in FIG. 1 has been peeled off.

As shown in FIG. 1, an insulated copper wire 10 has a rectangular copper wire 11 and an insulating film 12 coating the surface of the rectangular copper wire 11.

The rectangular copper wire 11 has a rectangular cross section and has edge surfaces formed along the short sides and flat surfaces formed along the long sides. As a material for the rectangular copper wire 11, it is possible to use copper and a copper alloy. The copper and the copper alloy are not particularly limited, and it is possible to use copper and copper alloys that are used in insulated copper wires of the related art. An oxygen-containing layer 13 containing 10 atom % or more of oxygen is provided on the surface of the rectangular copper wire 11. As oxygen in the oxygen-containing layer 13, CuO or $Cu_2O$ is mainly contained.

The insulating film 12 is formed of polyamide-imide. The film thickness of the insulating film 12 is preferably in a range of 10 μm or more and 50 μm or less.

As shown in FIG. 2, the insulated copper wire 10 has a peeled surface 14 formed by peeling off the insulating film 12. The peeled surface 14 is a portion where the rectangular copper wire 11 and the insulating film 12 are most likely to peel off from each other in the insulated copper wire 10. As a method for peeling off the insulating film 12, it is possible to use a method described in a mechanical performance test (peeling strength of conductors) of JIS C 5012: 1993 (Test methods for printed wiring boards). The size of the peeled surface 14 does not need to be the size described in JIS C 5012: 1993 and may be a size that can be analyzed by time-of-flight secondary ion mass spectrometry (TOF-SIMS) and Auger electron spectroscopy (AES) and may be, for example, approximately 5 mm.

On the peeled surface 14, there are more copper atoms bonded to a nitrogen atom or a carbon atom than copper atoms bonded to an oxygen atom. The copper atoms that are bonded to nitrogen atoms or carbon atoms are considered as copper atoms that have diffused from the rectangular copper wire 11 to the insulating film 12 and are bonded to nitrogen atoms or carbon atoms that configure an amide bond (—NH—CO—) or an imide bond (—CONHCO—) of the polyamide-imide that is contained in the insulating film 12. Therefore, the copper atoms that bonded to the nitrogen atoms or carbon atoms have a high affinity to the insulating film. The copper atoms that are bonded to oxygen atoms are considered as a copper oxide that has been generated on the surface of the rectangular copper wire 11 and diffused into the insulating film 12, and thus the copper atoms that are bonded to oxygen atoms have a low affinity to the insulating film 12. That is, on the peeled surface 14, a number of the copper atoms that are bonded to the polyamide-imide are present more than a number of the copper atoms that form a copper oxide. The peeled surface 14 is a portion where the adhesion between the rectangular copper wire 11 and the insulating film 12 is weakest and the rectangular copper wire 11 and the insulating film 12 are most likely to peel off from each other in the insulated copper wire 10. That is, in the insulated copper wire 10 of the present embodiment, since a number of the copper atoms having a high affinity to the polyamide-imide (the copper atoms that are bonded to nitrogen atoms or carbon atoms) are present on the peeled surface 14 more than the copper atoms having a low affinity to the polyamide-imide (the copper atoms that are bonded to oxygen atoms), a peeled surface 14 itself is less likely to be generated, and the rectangular copper wire 11 and the insulating film 12 are less likely to peel off from each other at the time of winding the insulated copper wire in a coil shape.

The amount of the copper atoms that are bonded to nitrogen atoms or carbon atoms and the amount of the copper atoms that are bonded to oxygen atoms can be measured by time-of-flight secondary ion mass spectrometry. In the present embodiment, the ratio ($CuC_2N_2^-/Cu_xO^-$ ratio) between the secondary ion intensity of a $CuC_2N_2^-$ ion and the total secondary ion intensity of a $CuO^-$ ion and a $Cu_2O^-$ ion that are measured by time-of-flight secondary ion mass spectrometry is set in a range of 2 or more and 50 or less. The $CuC_2N_2^-$ ion is an ion that has the copper atoms that are bonded to nitrogen atoms or carbon atoms. The $CuO^-$ ion and the $Cu_2O^-$ ion are ions that have the copper atoms that are bonded to oxygen atoms. In the insulated copper wire 10 of the present embodiment, a peeling strength necessary to form the peeled surface 14 becomes high. The $CuC_2N_2^-/Cu_xO^-$ ratio is preferably in a range of 4 or more and 20 or less.

In addition, the film thickness (d in FIG. 2) of the oxygen-containing layer 13 containing 10 atom % or more of oxygen, which is measured by analyzing elements in the depth direction (a direction toward the rectangular copper wire 11) from the peeled surface 14 by Auger electron spectroscopy, is set in a range of 2 nm or more and 30 nm or less. Oxygen in the oxygen-containing layer 13 is mainly bonded to copper to form CuO or $Cu_2O$. When the film thickness of the oxygen-containing layer 13 becomes too thin, there is a concern that the adhesion between the rectangular copper wire 11 and the insulating film 12 may deteriorate. On the other hand, when the film thickness of the oxygen-containing layer 13 becomes too thick, there is a concern that, at the time of winding the insulated copper wire 10 in a coil shape, the oxygen-containing layer 13 may fracture and the rectangular copper wire 11 and the insulating film 12 may peel off from each other. The film thickness of the oxygen-containing layer 13 is preferably in a range of 3 nm or more and 20 nm or less. In the oxygen-containing layer 13, the maximum value of the oxygen content is preferably shown in the vicinity of the peeled surface 14. The maximum value of the oxygen content is preferably present at a position 1 nm or more and 10 nm or less apart from the peeled surface 14. The maximum value of the oxygen content is preferably in a range of 20 atom % or more and 50 atom % or less.

Figure 3:
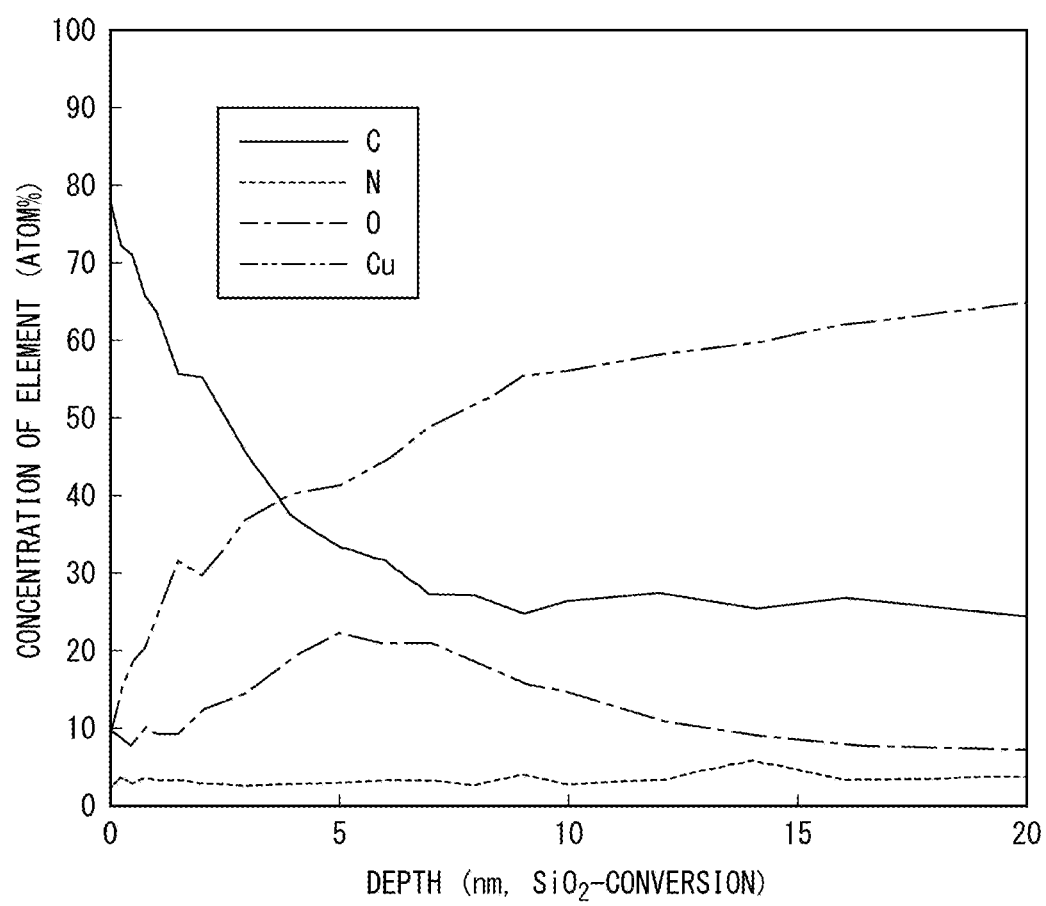
FIG. 3 is a composition distribution diagram obtained by analyzing elements of an insulated copper wire obtained in Invention Example 1 in a depth direction from a peeled surface by Auger electron spectroscopy.

FIG. 3 is a composition distribution diagram obtained by analyzing the elements of an insulated copper wire 10 obtained in Invention Example 1 described below in the depth direction from the peeled surface 14 by Auger electron spectroscopy. In the composition distribution diagram of FIG. 3, the horizontal axis indicates the depth from the peeled surface 14, and the vertical axis indicates the contents of the elements with respect to the total of the detected elements that is set to 100 atom %. In the composition distribution diagram of FIG. 3, it is found that, as the position moves in the depth direction from the peeled surface 14, the concentration of carbon (C) decreases, the concentration of oxygen (O) initially increases and then decreases, and the concentration of copper (Cu) continuously increases. The film thickness of the oxygen-containing layer 13 is 10 nm, and the oxygen content shows the maximum value at a depth of approximately 5 nm from the peeled surface 14. From this composition distribution diagram, it is conceivable that, as the position moves in the depth direction from the peeled surface 14, the content of a compound in which copper and polyamide-imide are bonded to each other decreases, accordingly, the content of a copper oxide increases and then the content of the copper oxide decreases, which makes the content of copper increase.

Next, a method of manufacturing the insulated copper wire 10 of the present embodiment will be described.

The insulated copper wire 10 of the present embodiment can be manufactured by a method including, for example, a polyamide-imide film formation step of forming a polyamide-imide film on the surface of the rectangular copper wire 11, an insulated copper wire production step of obtaining an insulated copper wire by seizing the polyamide-imide film to the rectangular copper wire 11 by heating, and a heat treatment step of heating the insulated copper wire 10.

In the polyamide-imide film formation step, it is possible to use an electrodeposition method and a dip method as a method for forming the polyamide-imide film on the surface of the rectangular copper wire 11. The electrodeposition method is a method in which the rectangular copper wire 11 and an electrode are immersed in an electrodeposition dispersion containing polyamide-imide particles having an electric charge dispersed in an organic solvent, and a direct-current voltage is applied between the rectangular copper wire 11 and the electrode, thereby electrodepositing the polyamide-imide particles to the surface of the rectangular copper wire 11 and forming the polyamide-imide film. The dip method is a method in which the rectangular copper wire 11 is immersed in varnish containing polyamide-imide dissolved in an organic solvent to apply the varnish to the surface of the rectangular copper wire 11, thereby forming the polyamide-imide film.

In the insulated copper wire production step, the polyamide-imide film-attached rectangular copper wire 11 obtained in the polyamide-imide film formation step is heated using a seizure furnace. As the seizure furnace, it is possible to use, for example, an electric furnace. The heating temperature is equal to or higher than the boiling point of an organic solvent of the liquid that is used to form the polyamide-imide film (electrodeposition dispersion or varnish) and lower than the decomposition temperature of the polyamide-imide and is usually in a range of 200° C. or higher and 350° C. or lower. The heating time varies depending on conditions such as the film thickness, temperature, and the like of the polyamide-imide film and is, for example, in a range of 1 minute or longer and 10 minutes or shorter.

In the heat treatment step, the insulated copper wire 10 obtained in the insulated copper wire production step is heated, thereby bonding copper that is contained in the rectangular copper wire 11 of the insulated copper wire 10 and a polyamide that is contained in the insulating film 12 and causing the oxygen-containing layer 13 to grow. The heating temperature is in a range of 180° C. or higher and lower than the melting point of polyamide-imide. The heating time varies depending on conditions such as the film thickness, temperature, and the like of the insulating film 12 and is, for example, in a range of 10 minutes or longer and 45 minutes or shorter, more preferably in a range of 10 minutes or longer and 40 minutes or shorter. The heat treatment step may be performed continuously with the insulated copper wire production step. For example, the insulated copper wire 10 may be heated by lowering the internal temperature of the seizure furnace after the insulated copper wire production step.

An electric coil according to an embodiment of the present invention is formed by winding the above-described insulated copper wire 10. A method for bending the insulated copper wire 10 may be edgewise bending in which the rectangular copper wire 11 is bent with the edge surfaces positioned inside or flatwise bending in which the rectangular copper wire 11 is bent with the flat surfaces positioned inside.

In the insulated copper wire 10 of the present embodiment configured as described above, since a number of the copper atoms that are bonded to nitrogen atoms or carbon atoms are present on the peeled surface 14 more than a number of the copper atoms that are bonded to oxygen atoms, the adhesion between the rectangular copper wire 11 and the insulating film 12 becomes strong. In addition, since the film thickness of the oxygen-containing layer 13 that is formed in the depth direction from the peeled surface 14 is set to 2 nm or more, the adhesion between the rectangular copper wire 11 and the insulating film 12 becomes strong. Furthermore, since the film thickness of the oxygen-containing layer 13 is as thin as 30 nm or less, the rectangular copper wire 11 and the insulating film 12 are less likely to peel off from each other due to fracture occurring in the oxygen-containing layer 13 at the time of winding the insulated copper wire in a coil shape.

In addition, the electric coil of the present embodiment is formed by winding the above-described insulated copper wire 10, and the rectangular copper wire 11 and the insulating film 12 are less likely to peel off from each other at the time of winding the insulated copper wire 10 in a coil shape, and thus the insulating film 12 is less likely to float or wrinkle.

Hitherto, the embodiment of the present invention has been described, but the present invention is not limited thereto and can be appropriately modified within the scope of the technical concept of the invention.

For example, in the insulated copper wire 10 of the present embodiment, the rectangular copper wire 11 is used as the copper wire, but the type of the copper wire is not limited thereto. As the copper wire, a round copper wire having a circular cross section may be used. In addition, polyamide-imide is used as the material of the insulating film 12, but the material of the insulating film 12 is not limited thereto. The material of the insulating film 12 may be any polymer material having an amide bond capable of bonding to a copper atom.

EXAMPLES

Next, the action and effect of the present invention will be described using examples.

Invention Example 1

(1) Production of Polyamide-Imide Film-Attached Rectangular Copper Wire

As a copper wire, a rectangular copper wire having a short side length of 1.5 mm and a long side length of 6.5 mm was prepared.

The above-described rectangular copper wire and an electrode were immersed in an electrodeposition dispersion containing 2 mass % of polyamide-imide particles, and a direct-current voltage was applied to the rectangular copper wire as the positive electrode and to the electrode as the negative electrode, thereby electrodepositing the PAI particles to the surface of the rectangular copper wire such that the thickness of an insulating film that was to be formed by heating reached 40 µm and forming a polyamide-imide film.

(2) Production of Insulated Copper Wire

The polyamide-imide film-attached rectangular copper wire obtained in the section (1) was put into a seizure furnace (electric furnace) and heated at 300° C. for 5 minutes, thereby seizing the polyamide-imide film to the rectangular copper wire and producing an insulated copper wire. After that, a heat treatment was performed for 40 minutes while the in-furnace temperature of the seizure furnace was dropped at a temperature drop rate of 2° C./min, and then the insulated copper wire was taken out from the seizure furnace and naturally cooled to room temperature.

Invention Example 2

An insulated copper wire was obtained in the same manner as in Invention Example 1 except that, in the production of the insulated copper wire of the section (2), a heat treatment was performed for 25 minutes on the insulated copper wire produced by heating the polyamide-imide film-attached rectangular copper wire at 300° C. for 5 minutes while the in-furnace temperature of the seizure furnace was dropped at a temperature drop rate of 3° C./min, and then the insulated copper wire was taken out from the seizure furnace and naturally cooled to room temperature.

Invention Example 3

An insulated copper wire was obtained in the same manner as in Invention Example 1 except that, in the production of the insulated copper wire of the section (2), the insulated copper wire produced by heating the polyamide-imide film-attached rectangular copper wire at 300° C. for 5 minutes was moved to an electric furnace that had been held at 250° C., held in the electric furnace for 10 minutes, next, moved to an electric furnace that had been held at 200° C., held in the electric furnace for 10 minutes, and then the insulated copper wire was taken out from the electric furnace and naturally cooled to room temperature.

Comparative Example 1

An insulated copper wire was obtained in the same manner as in Invention Example 1 except that, in the production of the insulated copper wire of the section (2), the insulated copper wire produced by heating the polyamide-imide film-attached rectangular copper wire at 300° C. for 5 minutes was immediately taken out from the seizure furnace and naturally cooled to room temperature.

Comparative Example 2

An insulated copper wire was obtained in the same manner as in Invention Example 1 except that, in the production of the insulated copper wire of the section (2), a heat treatment was performed for 120 minutes on the insulated copper wire produced by heating the polyamide-imide film-attached rectangular copper wire at 300° C. for 5 minutes while the in-furnace temperature of the seizure furnace was dropped at a temperature drop rate of 2° C./min, and then the insulated copper wire was taken out from the seizure furnace and naturally cooled to room temperature.

Comparative Example 3

An insulated copper wire was obtained in the same manner as in Invention Example 1 except that, in the production of the insulated copper wire of the section (2), the insulated copper wire produced by heating the polyamide-imide film-attached rectangular copper wire at 300° C. for 5 minutes was moved to an electric furnace that had been held at 250° C., held in the electric furnace for 20 minutes, next, moved to an electric furnace that had been held at 200° C., held in the electric furnace for 30 minutes, and then the insulated copper wire was taken out from the electric furnace and naturally cooled to room temperature.

Evaluation

On each of the insulated copper wires obtained in Invention Examples 1 to 3 and Comparative Examples 1 to 3, a peeled surface was formed by peeling off the insulating film in accordance with JIS C 5012: 1993 (Test methods for printed wiring boards). In addition, from the peeled surface of the insulated copper wire, the ratio ($CuC_2N_2^-/Cu_xO^-$ ratio) between the secondary ion intensity of a $CuC_2N_2^-$ ion and the total secondary ion intensity of a $CuO^-$ ion and a $Cu_2O^-$ ion and the film thickness of an oxygen-containing layer were measured by the following methods. In addition, adhesion in a portion where the peeled surface of the insulated copper wire was not formed at the time of winding the insulated copper wire in a coil shape was evaluated by the following method. These results are shown in Table 1 below.

The column "heat treatment conditions" in Table 1 are filled with all of the conditions for heat treatments in the insulated copper wire production step and the heat treatment step.

($CuC_2N_2^-/Cu_xO^-$ Ratio)

From the peeled surface, negative fragment ions were detected under measurement conditions of a primary ion being $Bi_3^+$ (30 kV) and an analysis area being 50 μm using a time-of-flight secondary ion mass spectrometer (PHI nano-TOF II, manufactured by ULVAC-PHI Inc.). Among the detected negative fragment ions, a peak with m/z=78.9 was regarded as a $CuO^-$ ion, a peak with m/z=114.9 was regarded as a $CuC_2N_2^-$ ion, a peak with m/z=141.8 was regarded as a $Cu_2O^-$ ion, the secondary ion intensities were read, and the $CuC_2N_2^-/Cu_xO^-$ ratio was calculated.

(Film Thickness of Oxygen-Containing Layer)

An Auger electron spectrum was obtained every 15 seconds while etching the peeled surface with an Ar ion using an Auger electron spectroscopic analyzer (PHI 700, manufactured by ULVAC-PHI Inc.). The accelerating voltage of the Ar ion was set to 1 kV, the accelerating voltage of an electron beam was set to 3 kV, and the tilt angle of the stage was set to 30°. From the intensities of the obtained Auger electron spectra, the atom % of each of the detected elements was calculated by the relative sensitivity factor method in which the element relative sensitivity factor was used. In addition, the etching time was converted to the depth from the peeled surface using the etching rate (1 nm/min) of the Auger electron spectroscopic analyzer, which had been measured in advance, and a composition distribution diagram was produced by indicating the depths from the peeled surface along the horizontal axis and indicating the content (atom %) of each of the detected elements along the vertical axis. In addition, the depth of a portion where the oxygen concentration continuously exceeded 10 atom % was read from the obtained composition distribution diagram, and this depth was regarded as the film thickness of the oxygen-containing layer. The etching rate of the Auger electron spectroscopic analyzer was measured using a $SiO_2$ film having a film thickness of 20 nm.

(Adhesion at Time of Winding Insulated Copper Wire in Coil Shape)

The insulated copper wire was bent along a round bar having a diameter of 6.5 mm by edgewise bending in an L shape (90 degrees) such that the bend radius reached 3.25 mm, thereby producing a coil having straight portions and an L-shape bent portion (edgewise coil).

The adhesion between the rectangular copper wire and the insulating film was evaluated from the surface state of the insulating film in the L-shape bent portion on the inner side of the coil. First, the surface of the insulating film in the L-shape bent portion on the inner side of the coil was observed using an optical microscope at a magnification of 20 times to confirm the presence or absence of unevenness. Next, for each insulated copper wire in which unevenness was confirmed from the surface of the insulating film, an enlarged view (300 times) of the portion where the unevenness was confirmed was observed in a direction perpendicular to the bending direction, a baseline that passed through portions where there was no unevenness was drawn, and the height of a protrusion portion (the distance between the highest position of the protrusion portion and the baseline) was measured. A case where no unevenness was confirmed on the surface of the insulating film was evaluated as "A", a case where unevenness was confirmed on the surface of the insulating film was confirmed, but the height of the protrusion portion was less than 5 μm was evaluated as "B", and a case where the height of the protrusion portion was 5 μm or more was evaluated as "C".

TABLE 1

| | Heat treatment conditions | $CuC_2N_2^-/Cu_xO^-$ ratio | Film thickness of oxide-containing layer (nm-$SiO_2$ conversion) | Adhesion at time of winding insulated copper wire in coil shape |
|---|---|---|---|---|
| Invention Example 1 | 300° C. × 5 minutes → temperature drop rate of 2° C./minute × 40 minutes | 12 | 10 | A |
| Invention Example 2 | 300° C. × 5 minutes → temperature drop rate of 3° C./minute × 25 minutes | 10 | 9 | A |
| Invention Example 3 | 300° C. × 5 minutes → 250° C. × 10 minutes → 200° C. × 10 minutes | 5 | 7 | A |
| Comparative Example 1 | 300° C. × 5 minutes | 1 | 0.5 | C |
| Comparative Example 2 | 300° C. × 5 minutes → temperature drop rate of 2° C./minute × 120 minutes | 5 | 60 | C |
| Comparative Example 3 | 300° C. × 5 minutes → 250° C. × 25 minutes → 200° C. × 30 minutes | 6 | 35 | C |

In all of the insulated copper wires of Invention Examples 1 to 3 in which the ratio ($CuC_2N_2^-/Cu_xO^-$ ratio) between the secondary ion intensity of the $CuC_2N_2^-$ ion and the total secondary ion intensity of the $CuO^-$ ion and the $Cu_2O^-$ ion, which were measured by time-of-flight secondary ion mass spectrometry, on the peeled surface was within the range of the present invention and the film thickness of the oxygen-containing layer, which was measured by analyzing the elements in the depth direction from the peeled surface by Auger electron spectroscopy, was within the range of the present invention, at the time of winding the insulated copper wire in a coil shape by edgewise bending, no unevenness was confirmed on the surface of the insulating film, and the adhesion between the rectangular copper wire and the insulating film became strong.

On the other hand, in the insulated copper wire of Comparative Example 1 in which the $CuC_2N_2^-/Cu_xO^-$ ratio on the peeled surface was below the range of the present invention and the film thickness of the oxygen-containing layer was thinner than the range of the present invention, at the time of winding the insulated copper wire in a coil shape by edgewise bending, a protrusion portion of 5 μm or more was confirmed on the surface of the insulating film, and the adhesion between the rectangular copper wire and the insulating film became weak. In addition, in the insulated copper wires of Comparative Examples 2 and 3 in which the $CuC_2N_2^-/Cu_xO^-$ ratio on the peeled surface was within the range of the present invention, but the film thickness of the oxygen-containing layer was thicker than the range of the present invention, at the time of winding the insulated copper wire in a coil shape by edgewise bending, a protrusion portion of 5 μm or more was confirmed on the surface of the insulating film, and the adhesion between the rectangular copper wire and the insulating film became weak.

INDUSTRIAL APPLICABILITY

According to the present invention, it becomes possible to provide an insulated copper wire in which adhesion between a copper wire and an insulating film is strong and the copper wire and the insulating film are less likely to peel off from each other at the time of winding the insulated copper wire in a coil shape and an electric coil in which the floating or wrinkling of an insulating film is suppressed.

REFERENCE SIGNS LIST

10: Insulated copper wire
11: Rectangular copper wire
12: Insulating film
13: Oxygen-containing layer
14: Peeled surface

What is claimed is:
1. An insulated copper wire comprising:
a copper wire; and
an insulating film coating a surface of the copper wire,
wherein the insulating film contains a polymer material having an amide bond, on a peeled surface formed on a surface of the insulated copper wire by peeling off the insulating film, there are more copper atoms bonded to a nitrogen atom or a carbon atom than copper atoms bonded to an oxygen atom,
an oxygen-containing layer containing 10 atom % or more of oxygen is formed in a depth direction from the peeled surface, and
a film thickness of the oxygen-containing layer is in a range of 2 nm or more and 30 nm or less.
2. The insulated copper wire according to claim 1, wherein the polymer material having an amide bond is polyamide-imide.
3. The insulated copper wire according to claim 1, wherein, on the peeled surface, a ratio between a secondary ion intensity of a $CuC_2N_2^-$ ions and a total secondary ion intensity of a $CuO^-$ ions and a $Cu_2O^-$ ions that are measured by time-of-flight secondary ion mass spectrometry is in a range of 2 or more and 50 or less.
4. The insulated copper wire according to claim 1, wherein the film thickness of the oxygen-containing layer is a value measured by Auger electron spectroscopy.
5. An electric coil formed by winding the insulated copper wire according to claim 1.

* * * * *